(12) United States Patent
Yoshiyuki

(10) Patent No.: US 6,345,208 B1
(45) Date of Patent: Feb. 5, 2002

(54) METHOD OF AND APPARATUS FOR PRODUCTION MANAGEMENT

(75) Inventor: Ishii Yoshiyuki, Minamiashigara (JP)

(73) Assignee: Fuji Photo Film Co., Ltd., Tokyo (JP)

( * ) Notice: Subject to any disclaimer, the term of this patent is extended or adjusted under 35 U.S.C. 154(b) by 0 days.

(21) Appl. No.: 09/515,863

(22) Filed: Feb. 29, 2000

Related U.S. Application Data

(63) Continuation-in-part of application No. 08/694,291, filed on Aug. 8, 1996, now Pat. No. 6,094,603.

(30) Foreign Application Priority Data

Aug. 9, 1995 (JP) ............................................. 7-203502
Aug. 6, 1996 (JP) ............................................. 8-206747

(51) Int. Cl.⁷ ......................... G06F 19/00; B23Q 41/08
(52) U.S. Cl. ........................... 700/97; 700/99; 700/106
(58) Field of Search ............................. 700/95, 97, 99, 700/106, 107, 117

(56) References Cited

U.S. PATENT DOCUMENTS

| | | | |
|---|---|---|---|
| 4,958,292 A | 9/1990 | Kaneko et al. | ............. 364/468 |
| 5,283,745 A | 2/1994 | Tanaka | ........................ 364/468 |
| 5,434,792 A | 7/1995 | Saka et al. | ................... 364/468 |
| 5,442,545 A | 8/1995 | Matsui et al. | ................ 364/468 |
| 5,456,001 A | 10/1995 | Mori et al. | .................... 29/739 |
| 5,506,783 A | 4/1996 | Tanaka et al. | ............... 364/468 |
| 5,793,638 A | * 8/1998 | Yao et al. | .................... 700/106 |

FOREIGN PATENT DOCUMENTS

| | | |
|---|---|---|
| JP | 2131829 | 5/1990 |
| JP | 4125205 | 4/1992 |

* cited by examiner

Primary Examiner—Paul P. Gordon
(74) Attorney, Agent, or Firm—Sughrue Mion, PLLC

(57) ABSTRACT

A production management computer indicate the number of parts corresponding to a number of products smaller than a planned number of products to be produced to a controller. A parts supplying section supplies the indicated number of parts through a parts holding section to a product producing section. When the number of parts held by the parts holding section becomes nil, semi-products held by a semi-product holding section are counted, and as many parts as the number of the counted number of semi-products are additionally supplied. The product producing section can produce products without causing an excess or shortage of parts.

2 Claims, 6 Drawing Sheets

METHOD OF AND APPARATUS FOR PRODUCTION MANAGEMENT

This is a Continuation-In-Part of U.S. Pat. No. 08/694,291 now U.S. Pat. No. 6,094,603 patented Jul. 25, 2000.

BACKGROUND OF THE INVENTION

1. Field of the Invention

The present invention relates to a method of and an apparatus for production management for manufacturing products from semi-products and parts.

2. Description of the Related Art

On a product manufacturing or assembling line, parts are supplied to semi-products on the product manufacturing or assembling line to complete desired products. If the number of semi-products varies due to defective components thereof or a change in the production plan, then supplied parts become excessive or insufficient in number. If supplied parts become insufficient in number and a delay occurs in supplementing parts, then the efficiency with which final products are manufactured is lowered. If supplied parts become excessive in number, then it is necessary to retrieve those excessive parts and store them in a warehouse when the type of final products is to change.

Various processes have heretofore been proposed for the purpose of supplying parts efficiently to production lines. For example, an MRP (Material Requirement Planning) process employs a computer for establishing a production plan beforehand, and supplies the number of parts required to produce a predetermined number of products at times when those products are produced. Another process is known as a parts-on-demand process which supplies parts depending on how the production on a production line progresses, so that a constant number of parts are kept on the production line at all times.

Japanese laid-open patent publication No. 4-125205 discloses an automatic warehouse control system which determines the number of parts to be delivered from a warehouse based on data of parts delivered at a given time from the warehouse according to a production plan and the actual number of parts delivered from the warehouse as entered from a terminal, so that parts can stably be supplied even when the production of parts is changed or modified from the production plan. Since the disclosed automatic warehouse control system requires the operator to enter the actual number of parts delivered from the warehouse through the terminal, however, the entered data are not highly reliable, and it is not possible to compare, on a real-time basis, the actual number of parts delivered from the warehouse and the number of parts delivered according to the production plan. Consequently, the automatic warehouse control system is unable to manage the delivery of parts so as not to cause an excess or shortage of parts when the operation of a production line is to be finished.

A parts delivery system disclosed in Japanese laid-open patent publication No. 2-131829 operates to supply parts in synchronism with an assembly line even when a production plan changes or a disagreement occurs between a production plan and an actual production achievement. Specifically, the disclosed parts delivery system reads assembly progress information with respect to products being assembled from bar code data, compares the read assembly progress information with progress data according to a production plan, calculates the type, number, and delivery timing of necessary parts, and instructs a warehouse to deliver the parts and also instructs a conveyor system to convey the parts. The parts delivery system is capable of supplying parts in synchronism with the assembly line to a certain extent. However, because parts are supplied prior to their being assembled on the assembly line, if the number of products that are actually produced varies due to defective products or a failure of the assembly line after the parts are supplied, then the parts are supplied out of synchronism with the assembly line, resulting in an excess or shortage of parts.

Furthermore, the parts delivery system requires complex data processing by a computer, such as processing of bar code data and data comparison. As a consequence, the parts delivery system is too expensive and not practical for the application to a small-scale production line for assembling one part on one semi-product, for example.

SUMMARY OF THE INVENTION

It is a general object of the present invention to provide a method of and an apparatus for production management which does not bring about an excess or shortage of parts and hence does not require parts to be retrieved when a production process is finished, allowing a production line to be operated efficiently, and which is of a highly simple arrangement.

A major object of the present invention is to provide a method of and an apparatus for production management to supply a number of parts corresponding to a number of products smaller than a planned number of products to semi-products for thereby producing the products, counting a remaining number of any semi-products when all the parts are supplied to the semi-products, and supplying a number of parts corresponding to the counted number of semi-products to the semi-products for thereby producing the products, so that the products can be produced of the semi-products and the parts without causing an excess of parts.

The above and other objects, features and advantages of the present invention will become more apparent from the following description when taken in conjunction with the accompanying drawings in which a preferred embodiments of the present invention is shown by way of illustrative example.

DETAILED DESCRIPTION OF THE PREFERRED EMBODIMENT

Figure 1:
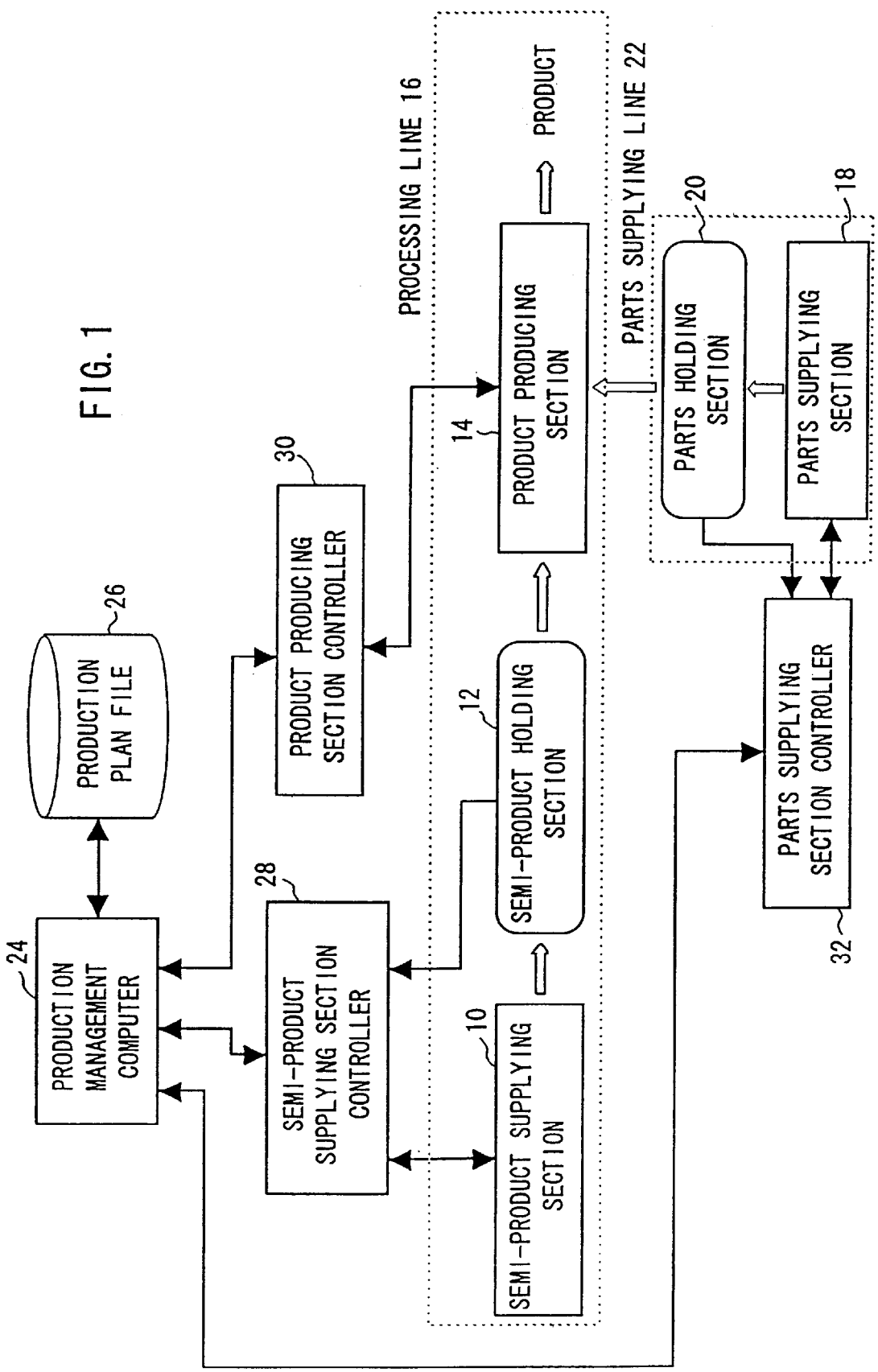
FIG. 1 is a block diagram of an overall arrangement of a production system which incorporates a method of and an apparatus for production management according to the present invention.

FIG. 1 shows in block form an overall arrangement of a production system which incorporates a method of and an apparatus for production management according to the present invention.

As shown in FIG. 1, the production system has a processing line 16 comprising a semi-product supplying section 10 for producing and supplying semi-products, a semi-product holding section 12 serving as a buffer for holding and delivering a predetermined number of semi-products supplied from the semi-product supplying section 10, and a product producing section 14 for assembling parts on semi-products supplied from the semi-product holding section 12 to produce products.

The production system also has a parts supplying line 22 comprising a parts supplying section 18 for processing and supplying parts, and a parts holding section 20 serving as a buffer for holding and delivering a predetermined number of parts supplied from the parts supplying section 18. The parts supplying section 18 is capable of supplying necessary parts, without a delay, through the parts holding section 20 to the product producing section 14, and may comprise an automatic warehouse, for example.

The processing line 16 and the parts supplying line 22 are controlled by a production management computer 24. The production management computer 24 has a production plan file 26 for holding data with respect to a planned number of products to be produced by the production system. The production management computer 24 controls the processing line 16 and the parts supplying line 22 through a semi-product supplying section controller 28 which mainly functions as a sequencer, a product producing section controller 30, and a parts supplying section controller 32.

Each of the above controllers 28, 30, 32 may be arranged to include a terminal computer.

Figure 2:
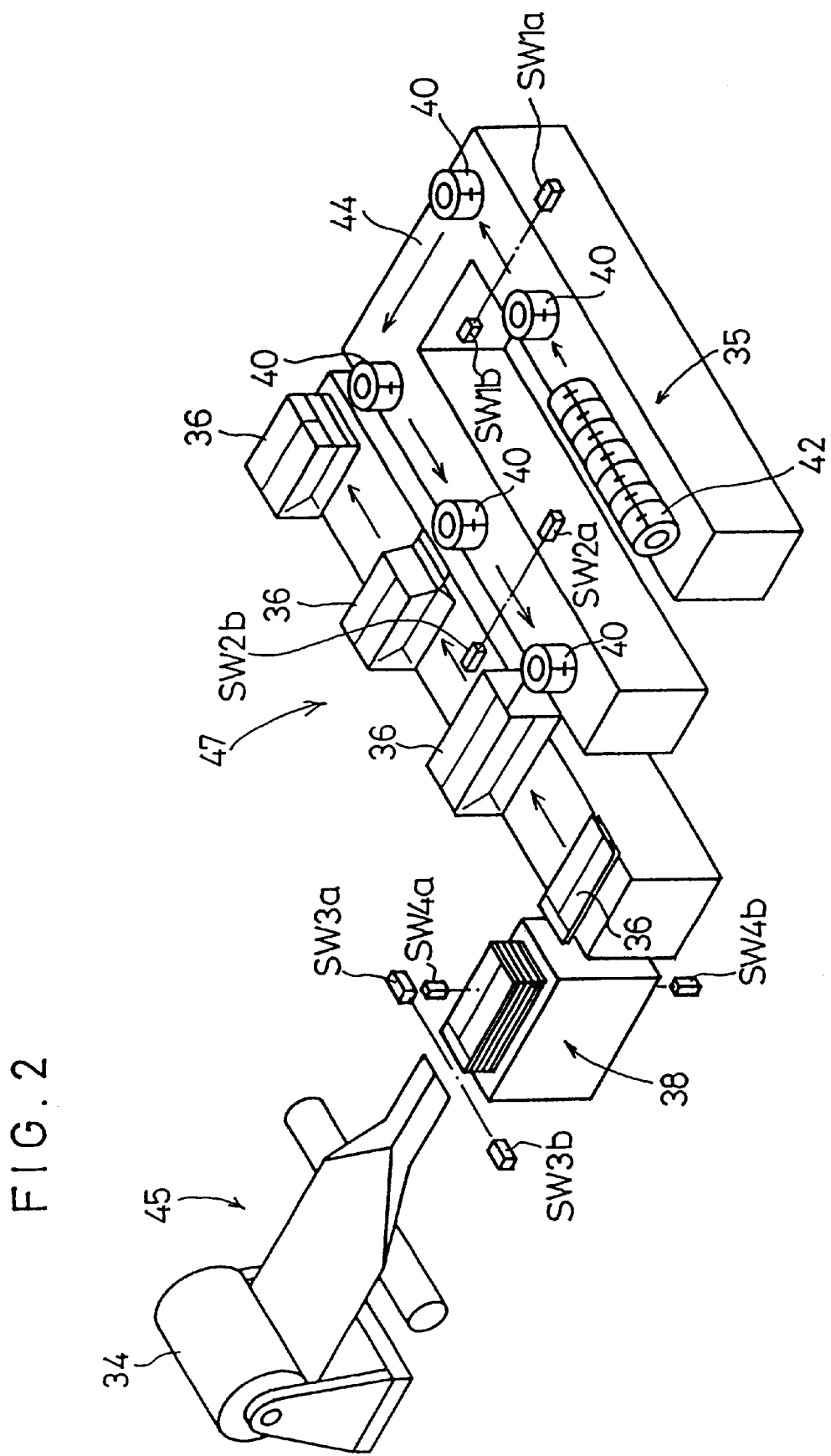
FIG. 2 is a perspective view of a film packaging line which is a specific example of a processing line and a parts supplying line of the production system shown in FIG. 1.
Figure 3:
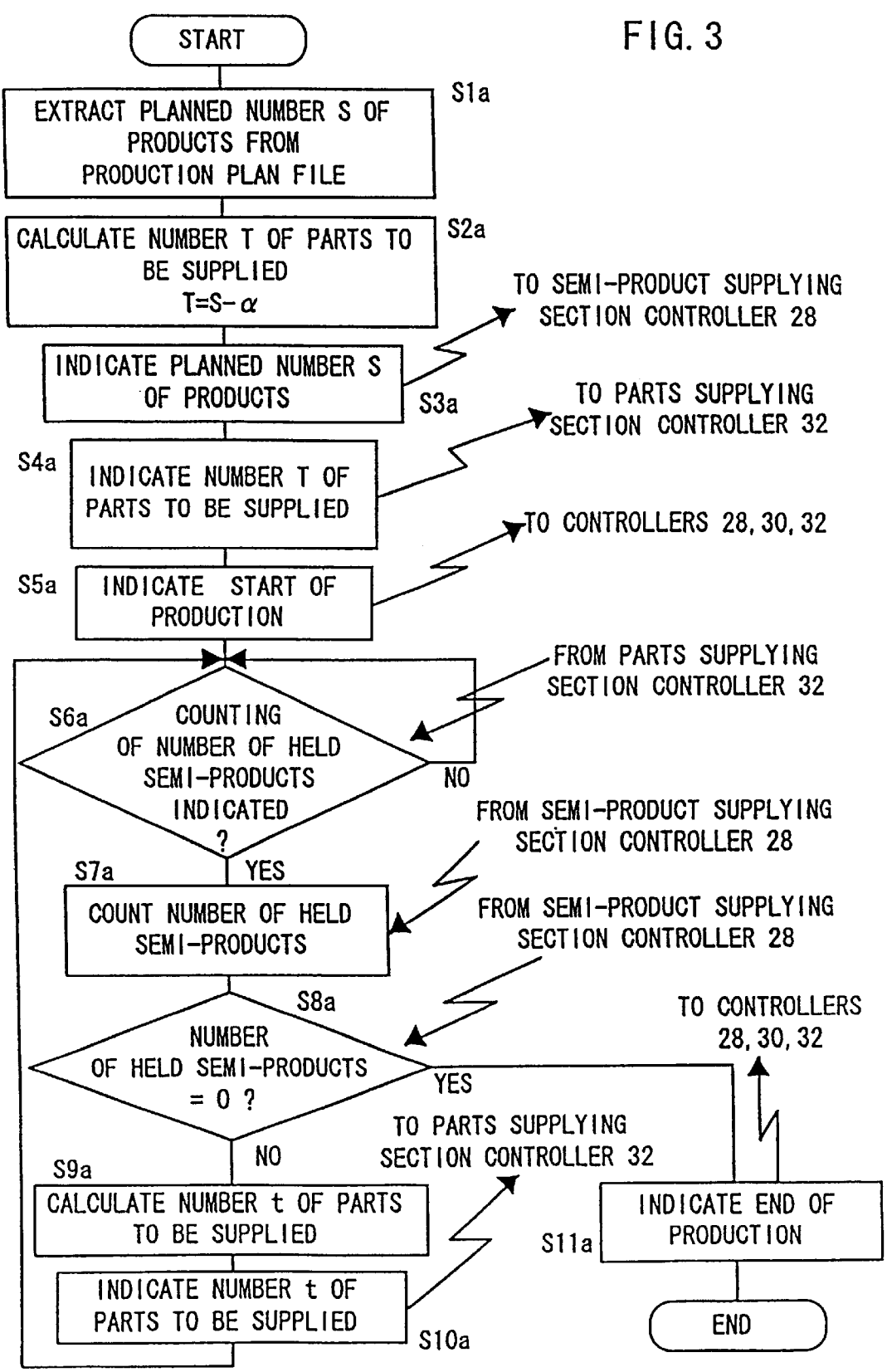
FIG. 3 is a flowchart of an information processing sequence carried out by a production management computer of the production system shown in FIG. 1.

FIG. 2 shows, in perspective a film packaging line which is a specific example of the processing line 16 and the parts supplying line 22. In FIG. 2, a film supply device 35, which corresponds to the semi-product supplying section 10 shown in FIG. 1, cuts off a roll of elongate film 42 into films 40 as semi-products and supplies the films 40. A conveyor line 44, which corresponds to the semi-product holding section 12 shown in FIG. 1, holds a predetermined number of films 40 supplied from the film supply device 35. A package producer 45, which corresponds to the parts supplying section 18 shown in FIG. 1, produces packages 36 as parts by folding and cutting a roll of raw sheet 34. A package holding buffer 38, which corresponds to the parts holding section 20 shown in FIG. 1, holds a predetermined number of packages 36 produced by the package producer 45. A packaging device 47, which corresponds to the product producing section 14 shown in FIG. 1, spreads open a package 36, places a film 40 in the spread package 36, and closes the opening of the package 36, thereby producing a product.

The conveyor line 44 is associated with a pair of photoelectric switches SW1a, SW1b for incrementing the number of films 40 each time a film 40 is supplied from the film supply device 35 thereby to count up the films 40, and a pair of photoelectric switches SW2a, SW2b for decrementing the number of films 40 which has been counted by the photoelectric switches SW1a, SW1b each time a film 40 is supplied to the packaging device 47 thereby to count down the films 40. Between the package producer 45 and the package holding buffer 38, there is disposed a pair of photoelectric switches SW3a, SW3b for counting packages 38 supplied from the package producer 45 to the package holding buffer 38. The package holding buffer 38 is associated with a pair of photoelectric switches SW4a, SW4b for detecting the remaining number of packages 38 which are held by the package holding buffer 38.

A method of production management in the production system shown in FIGS. 1 and 2 will be described below with reference to the flowcharts shown in FIGS. 3 through 6.

The production management computer 24 extracts a planned number S of products to be produced from production plan data stored in the production plan file 26 in a step S1a (see FIG. 3), and calculates the number T of parts to be supplied in a step S2a. Then, the production management computer 24 indicates the planned number S of products to be produced to the semi-product supplying section controller 28 in a step S3a, and also indicates the number T of parts to be supplied to the parts supplying section controller 32 in a step S4a.

The number T of parts to be supplied is set as the number of parts required for the number (S–α) of semi-products which is equal to the difference between the planned number S of products to be produced and a maximum number or a number close thereto, α, of semi-products (films 40) that can be held by the semi-product holding section 12. The number a is the same as the number of semi-product (film 40) shortages with respect to the planned number S of products to be produced.

Then, the production management computer 24 indicates a start of production to the controllers 28, 30, 32 in a step S5a, thereby starting to produce products, i.e., packaged films.

Figure 4:
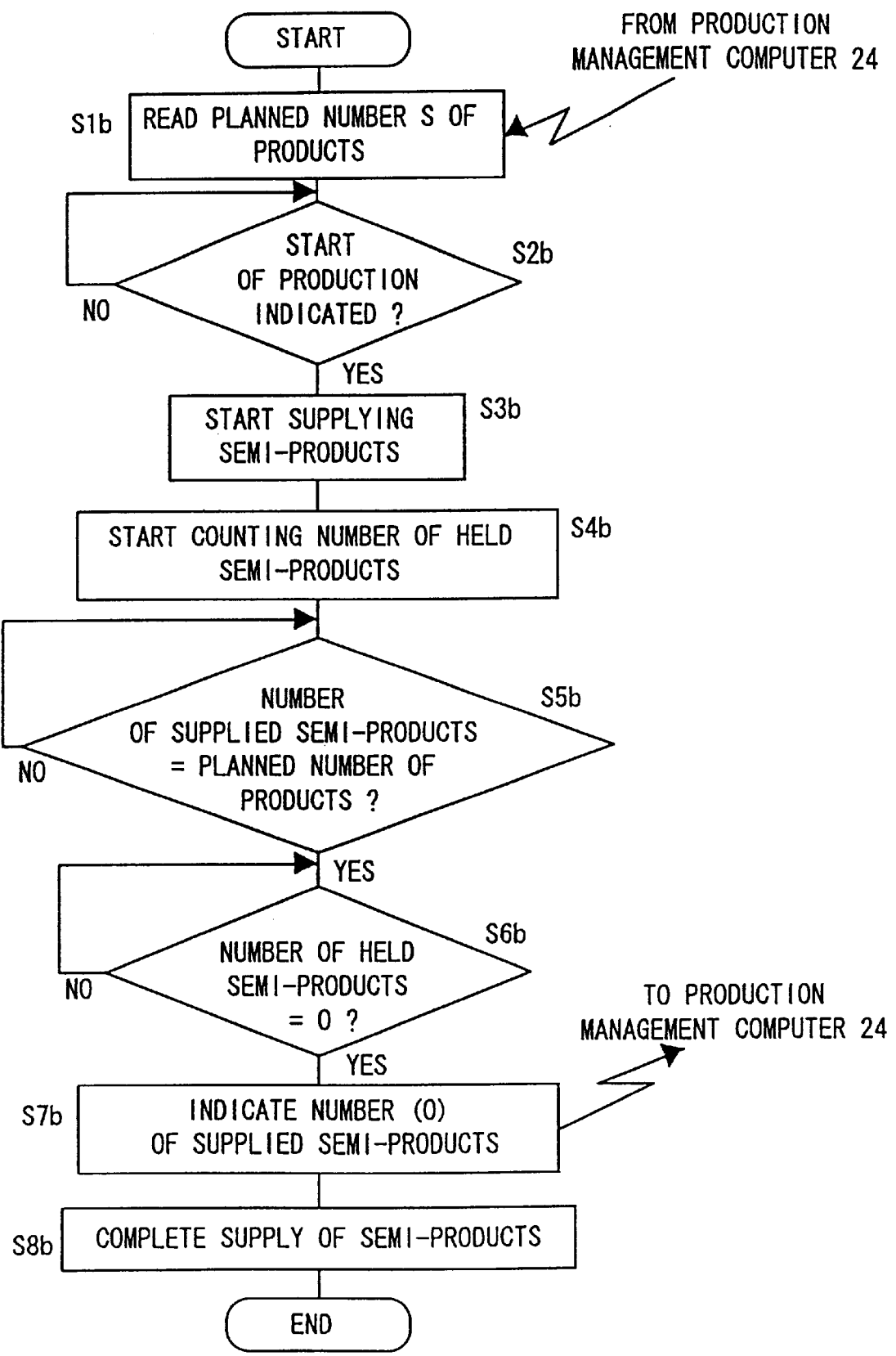
FIG. 4 is a flowchart of a control sequence of a semi-product supplying section controller of the production system shown in FIG. 1.

The semi-product supplying section controller 28 reads the planned number S of products to be produced which is supplied from the production management computer 24 in a step S1b (see FIG. 4). If a start of production is indicated in a step S2b, the semi-product supplying section controller 28 controls the semi-product supplying section 10 to produce semi-products (films 40) according to the planned number S of products to be produced, and supplies the semi-products through the semi-product holding section 12 to the product producing section 14 in a step S3b. At this time, when a film 40 is supplied to the conveyor line 44 corresponding to the semi-product holding section 12, the photoelectric switches SW1a, SW1b increment the number of films 40. When a film 40 is supplied to the packaging device 47, the photoelectric switches SW2a, SW2b decrement the counted number of films 40. As a result, the number of semi-products (films 40) held on the conveyor line 44 is counted in a step S4b.

Figure 5:
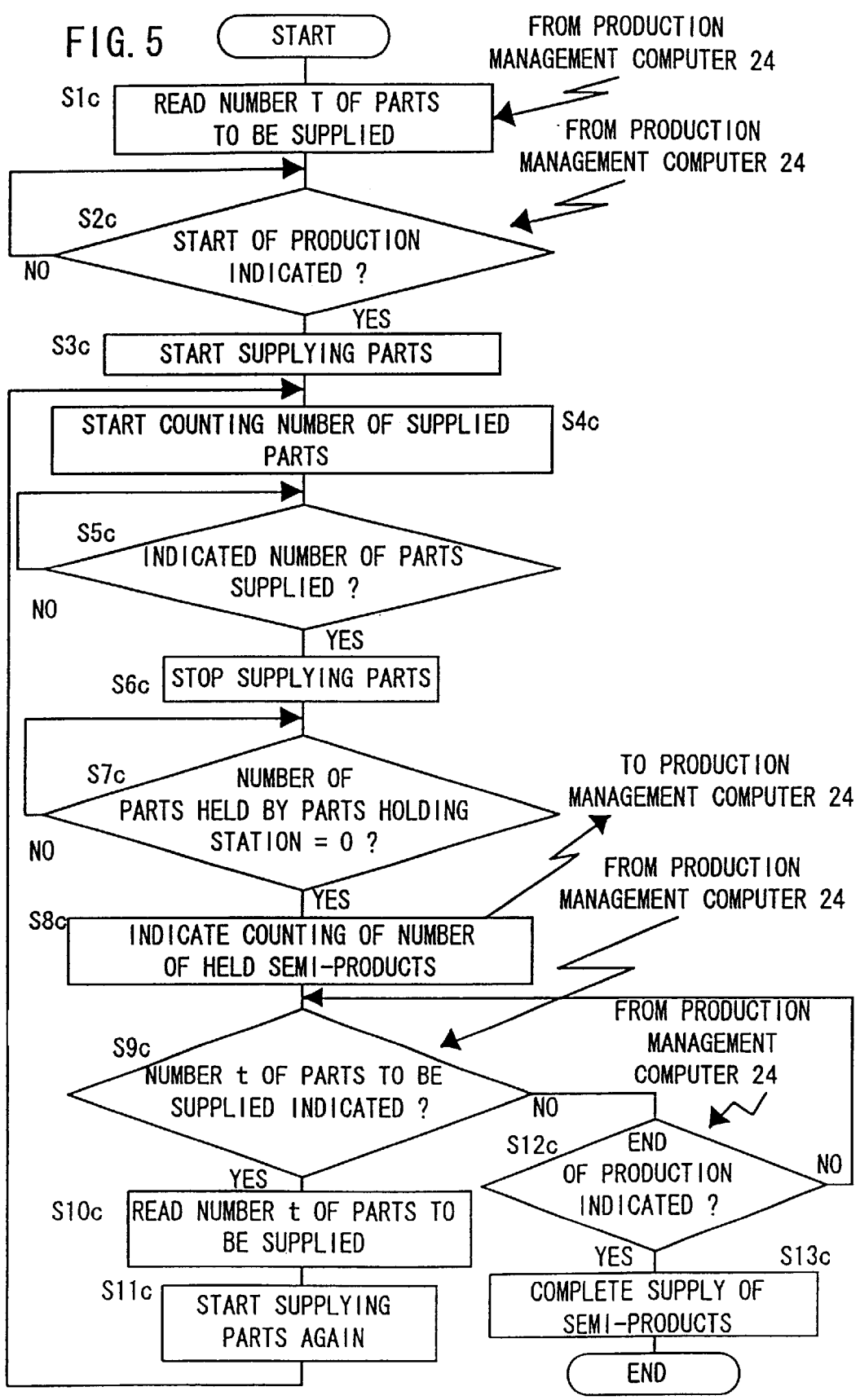
FIG. 5 is a flowchart of a control sequence of a parts supplying section controller of the production system shown in FIG. 1.
Figure 6:
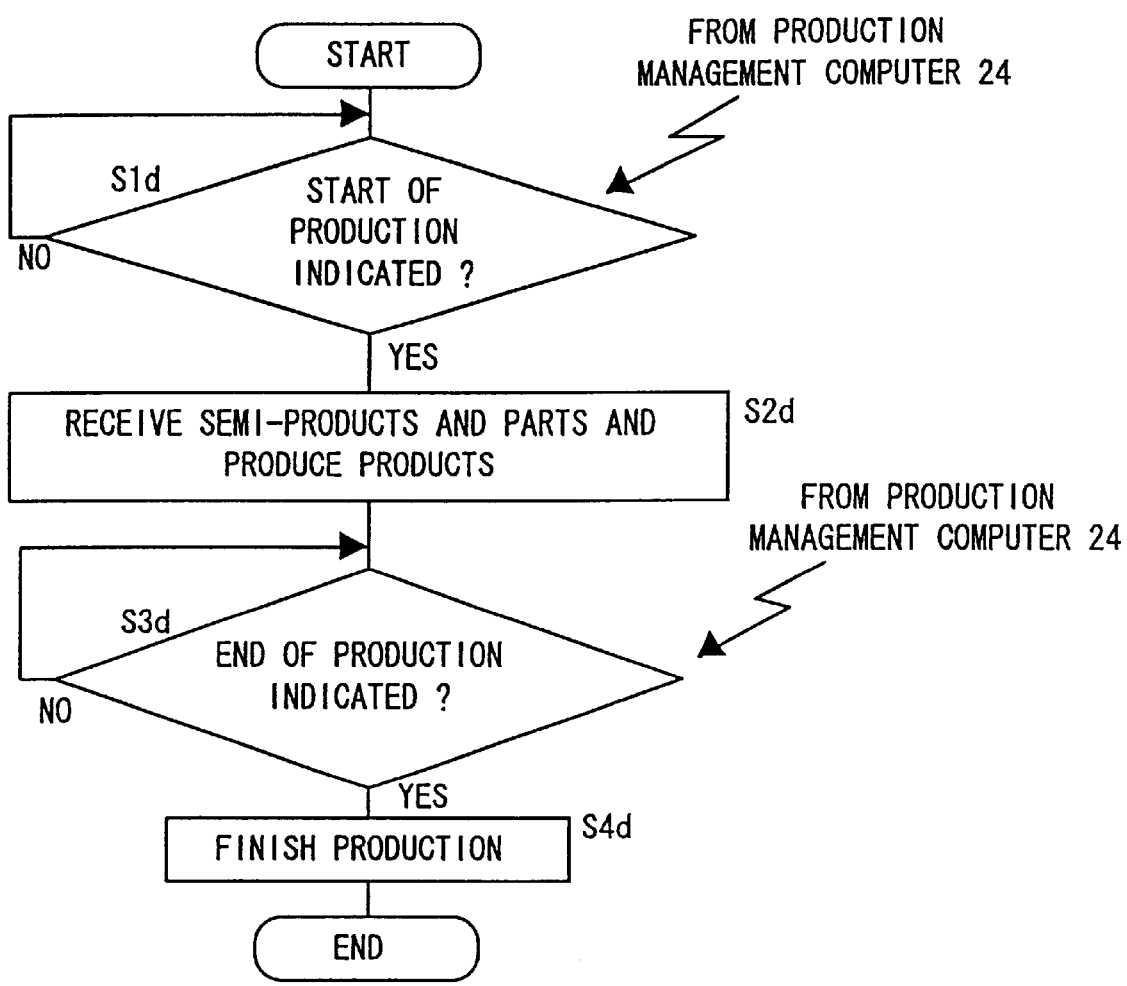
FIG. 6 is a flowchart of a control sequence of a product producing section controller of the production system shown in FIG. 1.

The parts supplying section controller 32 reads the number T of parts to be supplied which has been transferred from the production management computer 24 in a step S1c (see FIG. 5). If a start of production is indicated in a step S2c, the parts supplying section controller 32 controls the parts supplying section 18 to supply parts (packages 36) according to the number T of parts to be supplied which are required for the number (S –α) of semi-products that is smaller than the planned number S of products to be produced by the number α of semi-product shortages, through the parts holding section 20 to the product producing section 14 in a step S3c. At this time, when a package 36 is supplied to the package holding buffer 38, the photoelectric switches SW3a, SW3b increment the number of packages 36 held by the package holding buffer 38, thereby counting packages 36 held by the package holding buffer 38, in a step S4c. If the parts supplying section 18 supplies as many parts (packages 36) as the number T of parts to be supplied to the parts holding section 20 in a step S5c, then the parts supplying section controller 32 stops supplying parts in a step S6c.

If a start of production is indicated in a step S1d, then the product producing section controller 30 controls the packaging device 47 to insert semi-products (films 40) into parts (packages 36) in a step S2d.

The parts supplying section controller 32 monitors whether there is a part (package 36) in the package holding buffer 38 or not with the photoelectric switches SW4a, SW4b. If there is no part (package 36) in the package holding buffer 38 in a step S7c, then the parts supplying section controller 32 indicates the counting of semi-products (films 40) in the semi-product holding section 12 to the production management computer 24 in a step S8c.

In response to the counting indication from the parts supplying section controller 32 in a step S6a, the production management computer 24 counts semi-products held on the conveyor line 44 based on signals from the photoelectric switches SW1a, SW1b and SW2a, SW2b in a step S7a.

Since the number T of parts to be supplied from the parts supplying section 18 is smaller by the number α of semi-product (film 40) shortages, there are part (package 36) shortages with respect to the semi-product (film 40) shortages even if the production plan has not changed and defect-free semi-products (films 40) are supplied from the semi-product supplying section 10. If the planned number S of products to be produced varies due to a change in the production plan or defective semi-products (films 40) are removed, then the number α of semi-product (film 40) shortages varies and the number of parts required for the number α of semi-product (film 40) also varies.

If the number of semi-product (film 40) is not "0" in a step S8a, then the production management computer 24 determines the number t of parts required for the semi-products (film 40) which are held by the semi-product holding section 12 and counted in the step S7a, in a step S9a, and indicates again the number t of parts to the parts supplying section controller 32 in a step S10a. If the number t of parts is indicated in a step S9c, the parts supplying section controller 32 reads the number t of parts in a step S10c, and supplies the parts corresponding to the read number t of parts through the parts supplying section 18 to the parts holding section 20 in a step S11c. The product producing section 14 continues to produce products using the semi-products (films 40) supplied from the semi-product holding section 12 and the parts (packages 36) supplied from the parts holding section 20.

If the number of semi-products (films 40) counted by the photoelectric switches SW1a, SW1b reaches the planned number S of products in a step S5b and also if the number of semi-products (films 40) on the conveyor line 44 becomes "0" in a step S6b, then the semi-product supplying section controller 28 indicates that the number of semi-products (films 40) becomes "0" to the production management computer 24 in a step S7b, and the supply of semi-products (films 40) is completed in a step S8b. In response to the indication that the number of semi-products (films 40) becomes "0", the production management computer 24 indicates an end of production to the controllers 28, 30, 32 in a step S11a.

In response to the indication of the end of production from the production management computer 24 in a step S12c, the parts supplying section controller 32 completes the supply of parts (packages 36) in a step S13c. In response to the indication of the end of production from the production management computer 24 in a step S3d, the product producing section controller 30 finishes the production process in a step S4d.

As described above, the number of parts to be supplied to the product producing section 14 is set to a value smaller than the number of parts required for the planned number S of products according to the production plan, and the part shortages are added depending on the number of semi-products (films 40) held by the semi-product holding section 12. Therefore, the supply of parts (packages 36) is finished at the same time that the number of semi-products (films 40) becomes "0". Therefore, no extra semi-products and parts remain on the processing line 16 and the parts supplying line 22. Therefore, when the type of products needs to change, a process of producing a new type of products can efficiently be initiated because it is not necessary to retrieve remaining semi-products and parts. The number of supplied parts can easily be managed simply by counting parts held by the parts holding section 20. Therefore, a control arrangement for managing the number of supplied parts is highly simple. The present invention can thus be applied inexpensively to various systems ranging from simple to complex systems.

The number of semi-products that can be held by the semi-product holding section 12 in the processing line 16 should preferably be set closely to the number α of semi-product shortages for establishing the number of part shortages, in view of the rate of defective semi-products produced in the semi-product supplying section 10 and a change in the planned number of products to be produced. For example, if the number α of semi-product shortages is larger than the number of semi-products that can be held by the semi-product holding section 12, then semi-products tend to stay in the semi-product supplying section 10 at the time no parts are held by the parts holding section 20. If the number α of semi-product shortages is smaller than the number of semi-products that can be held by the semi-product holding section 12, then an excess of parts is liable to occur when the number of semi-products is greatly reduced.

The number of semi-products that can be held by the semi-product holding section 12 should preferably be equal to or smaller than the number of parts that can be held by the parts holding section 20. If the number of semi-products that can be held by the semi-product holding section 12 is larger than the number of parts that can be held by the parts holding section 20, then since the number of semi-products held by the semi-product holding section 12 is counted when no parts are held by the parts holding section 20, the processing line 16 has to be stopped each time no parts are held by the parts holding section 20.

In the above embodiment, parts supplied from the parts supplying section 18 are assembled on semi-products. However, the principles of the invention are also applicable to a system for supplying parts from a plurality of parts supplying sections to semi-products. In such a system, parts holding sections may be positioned between the parts supplying sections and the product producing section 14, the remaining number of parts, fewer than the planned number S by a given number of parts, supplied to each of the parts holding sections may be monitored, and when the remaining number becomes "0", semi-products held by the semi-product holding section 12 may be counted and parts necessary for those semi-products may be additionally supplied.

In the film packaging line shown in FIG. 2, no packages 36 remain on the package holding buffer 38, and no films 40 remain on the conveyor line 44. The film packaging line is usually installed in a dark room, and hence any process of retrieving remaining packages 36 and films 40 in the dark room when the type of films 40 needs to change would be quite tedious and time-consuming. According to the present invention, however, it is not necessary to carry out such a retrieving process.

Specifically, films 40 cut off from the roll of elongate film 42 are produced by the film supply device 35, supplied to and held on the conveyor line 44, and then supplied to the packaging device 47. At this time, the film supply device 35 supplies as many films 40 as the planned number S of products to be produced to the conveyor line 44. Packages 36 are produced from the roll of raw sheet 34 by the package producer 45, supplied to and held on the package holding buffer 38, and then supplied to the packaging device 47. At this time, the number of supplied packages 36 is set to the number T of parts to be supplied which is smaller than the planned number S of products by the number $\alpha$. Therefore, the number of packages 36 on the package holding buffer 38 becomes "0" before the number of films 40 on the conveyor line 44 becomes "0". When the number of packages 36 on the package holding buffer 38 becomes. "0", the remaining films 40 on the conveyor line 44 are counted, and as many packages 36 as the counted number of films 40 are additionally supplied. Therefore, the planned number S of products can be produced without leaving any films 40 and packages 36 unassembled. Even when the planned number S of products is changed or the number of films 40 is reduced due to defective films, if the change in the planned number S or the reduction in the number of films 40 falls within the preset number $\alpha$ of packages 36, then films 40 can be packaged by packages 36 without causing any excess or shortage of films and packages.

When the planned number S of products is changed from the originally determined number, it is not necessary for an operator to reset the planned number S to the changed number, and the number of the packages 36 corresponding to the remaining numbers of the films 40 automatically counted can be obtained. Therefore, it becomes possible to supply the packages 36 without causing any excess or shortage. As a consequence, no films 40 nor packages 36 remain on the processing line 16 when a production process is finished.

In the present invention, the semi-products as a primary product are produced according to the planned number of products based on the production plan. Further, the parts as a secondary product to be supplied to the semi-products are supplied according to the change of the production plan or the planned number of products without delay. In the present invention, the number of parts which is smaller than the planned number of products are supplied to the semi-products produced according to the planned number of products. When all the parts are supplied to the semi-products, the remaining semi-products are counted, so that the number of parts corresponding to the counted number of the semi-products can be supplied without delay.

According to the present invention, as described above, since parts required for semi-products are supplied without any undesired excess or shortage, it is not necessary to retrieve parts when the type of products needs to change or parts or semi-products switch from lot to lot. As a consequence, the production line can be operated highly efficiently. Since it is only necessary to count semi-products when the number of parts becomes "0" and additionally supply the number of parts corresponding to the counted number of semi-products, the arrangement of the present invention is quite simple, and hence can easily be incorporated in a variety of production lines.

Although a certain preferred embodiment of the present invention has been shown and described in detail, it should be understood that various changes and modifications may be made therein without departing from the scope of the appended claims.

What is claimed is:

1. A method of production management, comprising the steps of:
    (a) supplying semi-products according to a planned number of products to be produced;
    (b) supplying a number of parts corresponding to a number of products which is smaller than said planned number of products;
    (c) producing products by supplying the semi-products with the supplied parts;
    (d) counting a remaining number of the parts to be supplied to the semi-products;
    (e) counting the remaining number of the semi-products when the remaining number of the parts counted in the step (d) becomes nil; and
    (f) supplying a number of the parts corresponding to the remaining number of the semi-products counted in the step(e).

2. A method according to claim 1, wherein said steps (c) to (f) are repeated until the remaining number of the semi-products becomes nil.

* * * * *